US006792975B2

(12) United States Patent
Erickson et al.

(10) Patent No.: US 6,792,975 B2
(45) Date of Patent: Sep. 21, 2004

(54) PULSE-WIDTH MODULATED SOLENOID VALVE INCLUDING AXIAL STOP SPOOL VALVE

(75) Inventors: Bradley C. Erickson, Clarkston, MI (US); Richard E. Jungwirth, Clinton Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 116 days.

(21) Appl. No.: 10/140,011

(22) Filed: May 7, 2002

(65) Prior Publication Data

US 2002/0195151 A1 Dec. 26, 2002

Related U.S. Application Data

(60) Provisional application No. 60/293,447, filed on May 24, 2001.

(51) Int. Cl.[7] .............................................. F15B 13/044
(52) U.S. Cl. ............................ 137/625.65; 137/625.27; 251/129.07
(58) Field of Search ....................... 137/625.27, 625.65; 251/129.07

(56) References Cited

U.S. PATENT DOCUMENTS

| | | | |
|---|---|---|---|
| 3,561,482 A | | 2/1971 | Taplin |
| 3,756,558 A | | 9/1973 | Okui |
| 4,450,869 A | | 5/1984 | Acker |
| 4,529,006 A | | 7/1985 | Block et al. |
| 4,653,723 A | | 3/1987 | Rizk et al. |
| 4,655,249 A | * | 4/1987 | Livet ..................... 137/625.65 |
| 4,690,374 A | | 9/1987 | Polach et al. |
| 4,746,094 A | | 5/1988 | Cummins |
| 4,810,985 A | | 3/1989 | Mesenich |
| 4,844,122 A | * | 7/1989 | Ichihashi ............... 137/625.65 |
| 4,852,853 A | | 8/1989 | Toshio et al. |
| 4,979,542 A | * | 12/1990 | Mesenich ............... 137/625.65 |
| 5,046,530 A | | 9/1991 | Gossner et al. |
| 5,127,624 A | | 7/1992 | Domke |
| 5,168,898 A | | 12/1992 | Gottling et al. |
| 5,218,999 A | | 6/1993 | Tanimoto |
| 5,396,926 A | | 3/1995 | Pataki et al. |
| 5,497,806 A | | 3/1996 | Swank et al. |
| 5,518,030 A | | 5/1996 | Liu et al. |
| 5,603,483 A | | 2/1997 | Reuter et al. |
| 5,606,992 A | * | 3/1997 | Erickson et al. ....... 137/596.17 |

OTHER PUBLICATIONS

Neuffer, K., Englesdorf, K; and Brehm, W, "Electronic Transmission Control—From Stand Alone Components to Mechatronic Systems", Reprinted from Transmission and Driveline Systems Symposium: Efficiency, Components and Materials (SP–1154); SAE Technical Paper Series 960430, Feb. 26–29, 1996, 2 pgs..

* cited by examiner

Primary Examiner—Gerald A. Michalsky
(74) Attorney, Agent, or Firm—Warn, Hoffmann, Miller & LaLone, P.C.; Greg Dziegielewski

(57) ABSTRACT

A solenoid control valve having a spool valve disposed within a valve body and an enlarged diameter, axially sealing land. An upper surface of the sealing land seats against an upper valve stop when the spool valve is in a first sealing position and a lower surface of the sealing land seats against a lower valve stop when the spool valve in a second sealing position, to provide sealing pressure in an axial direction relative to the movement of the spool valve. The control valve includes an actuating portion having a coil and an armature. The armature is in direct contact with the spool valve, preferably through a stem that extends through the upper valve stop. When the coil is not energized, a valve spring biases the spool valve to seat against the upper valve stop so that a source pressure is provided at a control port. When the coil is energized, the armature moves the spool valve away from the upper valve stop against the bias of the valve spring and causes the sealing land to seat against the lower valve stop, sealing off the source pressure port. In this configuration, the control pressure is allowed to vent to exhaust.

15 Claims, 2 Drawing Sheets

PULSE-WIDTH MODULATED SOLENOID VALVE INCLUDING AXIAL STOP SPOOL VALVE

CROSS REFERENCE TO RELATED APPLICATIONS

This application claims the benefit of U.S. Provisional Application No. 60/293,447, titled Pulse-Width Modulated Solenoid Valve Including Axial Stop Spool Valve, filed May 24, 2001.

BACKGROUND OF THE INVENTION

1. Field of the Invention

This invention relates generally to a fluid control valve and, more particularly, to a balanced pulse-width modulated solenoid control valve.

2. Discussion of the Related Art

Most modern vehicles employ an automatic transmission controller which has several solenoid operated fluid control valves that are independently actuated to control the pressure of the transmission fluid in the vehicle's transmission to operate various components of the transmission. For example, solenoid operated fluid control valves are known that use transmission fluid pressure to provide direct clutch control and line pressure control applications. The torque transmitted by a certain transmission clutch may be varied by varying the pressure of engagement between opposed clutch plates. Presently available transmission controllers can rapidly and precisely generate the desired electrical output signals used to operate the control valves in response to sensed vehicle operating conditions to provide this pressure.

One particular known solenoid valve used for this purpose is referred to as a balanced pulse-width modulated (PWM) solenoid valve, well known to those skilled in the art. Pulse-width modulated solenoid valves are used to supply a hydraulic control pressure that is a function of the duty cycle of a pulse-width modulated driver signal. A control pressure is provided that has a true linear relationship to variations in "on-time" of the solenoid coil. A valve element that establishes a fluid connection of a control port to a pressure supply must be capable of rapid shifting movements in close synchronization with the energization and de-energization of the coil. In order to effectively provide this transmission control, the pulse-width modulated solenoid control valve should prevent the occurrence of oscillations due to the natural frequencies in the system, and smooth the pressure pulsations. The frequency of operation of the control valve is typically in the range of 12–100 Hz. Additionally, the valve seats must be capable of withstanding up to $1 \times 10^9$ switching operations at this frequency.

Most balanced PWM solenoid valves rely on the traditional spool valve design, known in the art, where the spool valve is slidably reciprocated within a valve body to move valve lands to selectively open and close hydraulic ports within the valve body. The amount of overlap between the spool valve lands and the valve body metering edges determines the degree of leakage through these ports when they are closed or sealed for a given spring pressure and coil current. Because these overlaps are necessarily small due to the need for high flow and good dynamic performance, and the coil currents and spring bias are usually low to decrease costs, the typical balanced PWM valve has relatively high leakage. Known designs try to minimize leakage by relying on expensive processing to form, for example, high precision spool valve outer diameters and valve body inner diameters to reduce radial clearance and compensate for the small overlap. Undesirably, this high precision processing results in higher production costs.

As the controllers become more sophisticated, the solenoid operated control valves must also include advancements and improvements over the state of the art. In this regard, it becomes important to increase the operating efficiency, reduce the cost, reduce the weight, reduce the complexity, etc. of the existing solenoid operated fluid control valves. Therefore, advancements in size, part reduction, component simplification, etc. of the control valves are advantageous.

It is an object of the present invention to provide a simplified solenoid control valve that is easy to manufacture, and has a reduced amount of leakage over those valves known in the art.

SUMMARY OF THE INVENTION

A solenoid control valve having a spool valve disposed within a valve body and an enlarged diameter sealing land which axially engages and seals against a valve stop. In the preferred embodiment, an upper surface of the sealing land seats against an upper valve stop when the spool valve is in a first sealing position and a lower surface of the sealing land seats against a lower valve stop when the spool valve in a second sealing position, to provide sealing pressure in an axial direction relative to the movement of the spool valve. The control valve includes an actuating portion having a coil and an armature. The armature is in direct contact with the spool valve, preferably through a stem that extends through the upper valve stop. When the coil is not energized, a valve spring biases the spool valve to seat against the upper valve stop so that a source pressure is provided at a control port. When the coil is energized, the armature moves the spool valve away from the upper valve stop against the bias of the valve spring and causes the sealing land to seat against the lower valve stop, sealing off the source pressure port. In this configuration, the control pressure is allowed to vent to exhaust.

Objects, features and advantages of the invention include providing a solenoid fluid control valve that is not dependent on close radial clearances between a spool valve and a valve body to provide a seal, enables axial engagement of a sealing surface and a valve stop to provide a seal, reduces leakage, reduces or eliminates expensive processing to form the spool valve and valve body, is more tolerant of contaminates, is readily adaptable to a wide range of fluid applications, is reliable, durable, of relatively simple design, and is less costly to manufacture and assemble.

BRIEF DESCRIPTION OF THE DRAWINGS

Additional objects, features and advantages of the present invention will become apparent from the following description and appended claims, taken in conjunction with the accompanying drawings, in which:

DETAILED DESCRIPTION OF THE PREFERRED EMBODIMENTS

The following discussion of the preferred embodiments directed to a pulse-width modulated solenoid control valve is merely exemplary in nature, and is in no way intended to limit the invention or its applications or uses. Other embodiments and modifications within the spirit and scope of the invention will be apparent to those skilled in the art.

Figure 1:
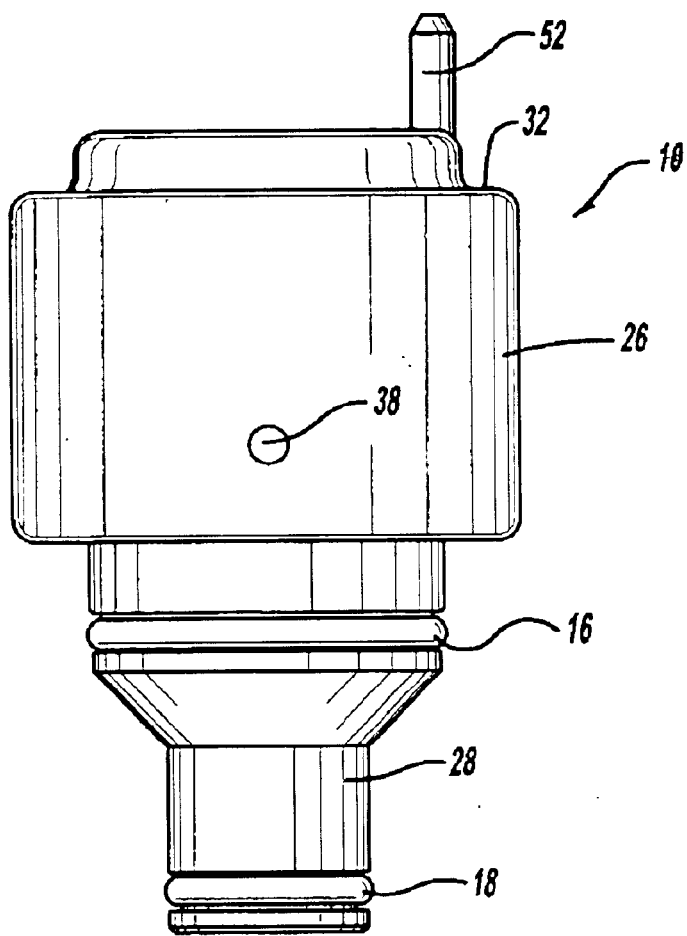
FIG. 1 is an elevational view of a balanced pulse-width modulated solenoid control valve according to an embodiment of the present invention.
Figure 2:
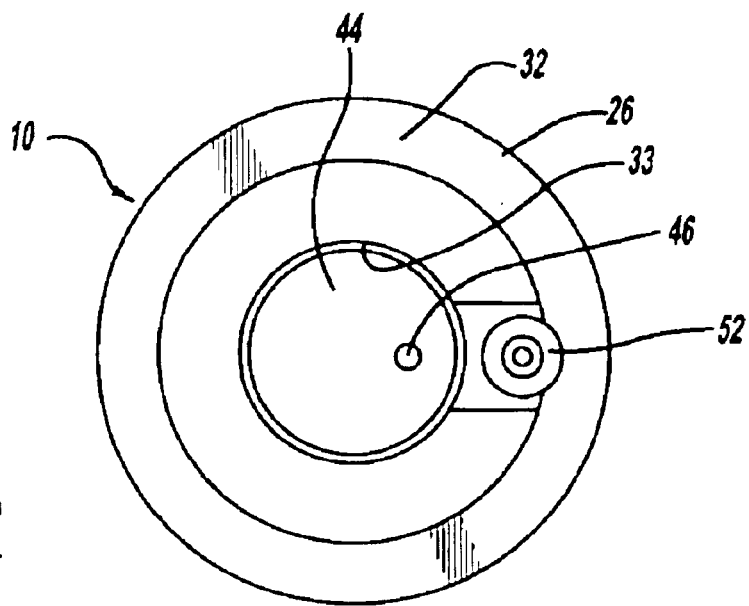
FIG. 2 is a top view of the solenoid control valve shown in FIG. 1.
Figure 3:
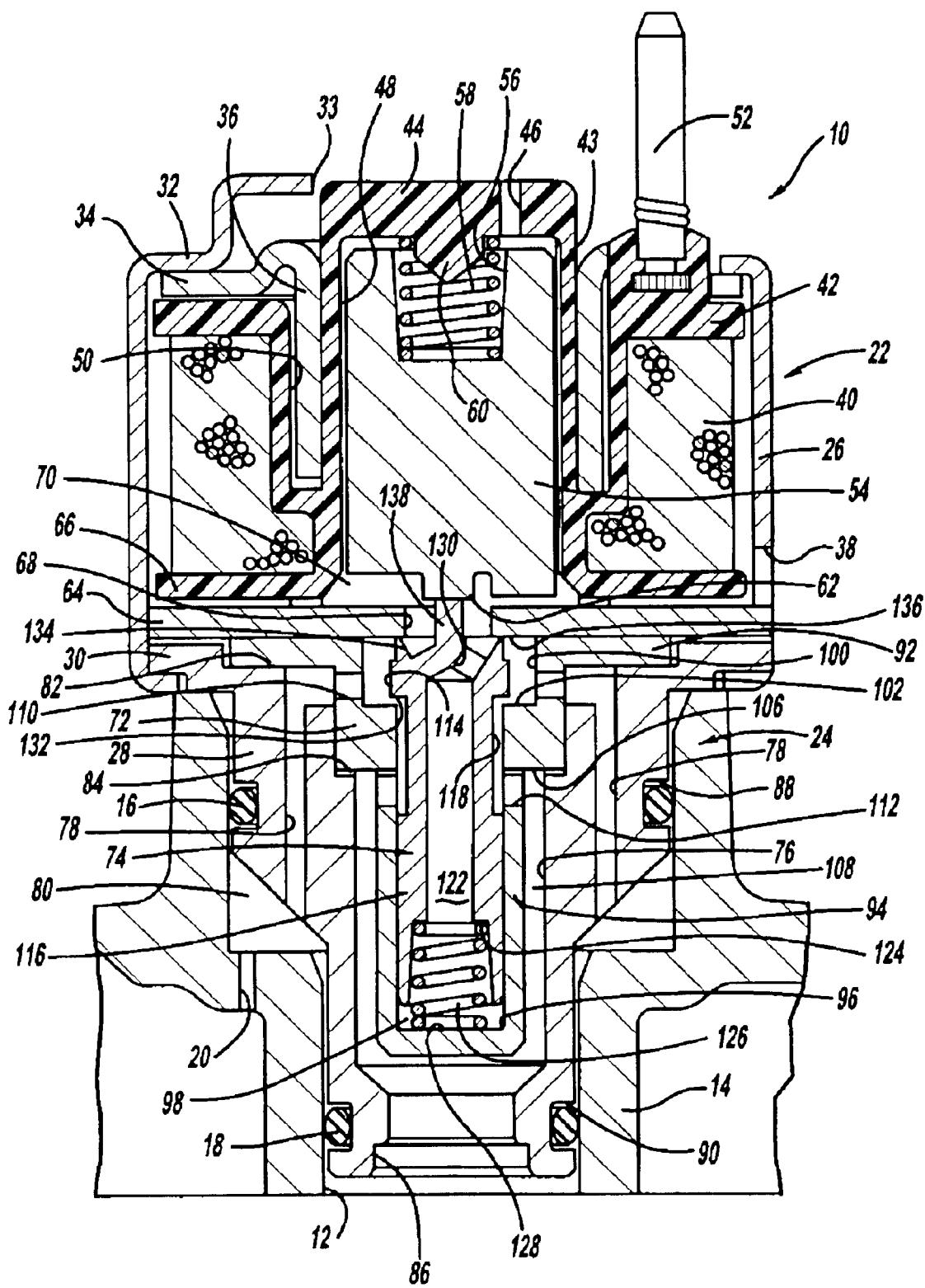
FIG. 3 is a cross-sectional view of the solenoid control valve shown in FIG. 1.

Referring in more detail to the drawings, FIGS. 1–3 illustrate a balanced pulse-width modulated solenoid control valve 10, according to an embodiment of the present invention, that has an application to control the clutch or line pressure in an automatic transmission of a vehicle. The use of pulse-width modulated solenoid control valves to provide clutch control and line pressure control in an automatic transmission is known in the art. Therefore, the specific hydraulic connections, source pressures and control pressures used in association with the control valve 10 will not be shown or described below, as they form no part of the present invention, and are well known to those skilled in the art. Also, as will be appreciated by those skilled in the art, the control valve 10 of the invention is not limited for use in an automatic transmission of a vehicle, but has a much broader use in any control device that may use a solenoid valve of the type described herein.

As shown in FIG. 3, the control valve 10 is secured within an opening 12 of a main module casting 14 of a vehicle transmission (not shown) by a suitable securing mechanism, such as a bolt (not shown). The control valve 10 is sealed within the opening 12 by a pair of O-rings 16 and 18, as shown, to prevent leakage through the opening 12. The main module casting 14 would typically include other solenoid valves, stepper motors, hydraulic components, etc. used in the control of an automatic transmission for a vehicle, as it would be well understood to those skilled in the art. The casting 14 has a control port 20 and a control pressure source communicates with the control valve 10 through the opening 12 and the control port 20.

The control valve 10 includes an actuating portion 22 and a fluid control portion 24. The actuating portion 22 includes a cylindrical housing or can 26 that encloses solenoid components of the valve 10. The can 26 may be made of any suitable magnetic material, such as steel. The can 26 is attached to an outer sleeve 28 by crimping or rolling a lower edge of the can 26 about a peripheral edge of a radially outwardly extending flange 30 of the outer sleeve 28. To join the actuating portion 22 to the fluid control portion 24, an upper portion 32 of the can 26 defining an opening 33 is crimped or rolled over a flange 34 of a flux tube 36 of the actuating portion 22. Of course, other means of joining the actuating portion 22 and fluid control portion 24 may be employed, as can other means to connect the can 26 to the sleeve 28 and flux tube 36, such as welding, threaded mounting, mechanical fasteners, adhesives, and the like. A series of exhaust ports 38 are formed through the can 26 to allow hydraulic fluid in the valve 10 to be exhausted to a sump or exhaust tank in accordance with the operation of the valve 10.

The actuating portion 22 has a coil 40 wound on a non-magnetic bobbin 42 and coaxially mounted with the can 26, as shown. The bobbin 42 is an insulative member, and may be formed from plastic molded to a desired configuration to conform to the various components in the actuating portion 22. The bobbin 42 has a generally cylindrical sidewall 43 terminating in a circular end wall 44 having an exhaust leakage port 46 formed therethrough to allow hydraulic fluid to be exhausted from the actuating portion 22. The bobbin defines a cylindrical cavity 48 preferably centered in the can and communicating with the exhaust port 46. The flux tube 36 extends down into an opening 50 in the bobbin 42 between the coil 40 and the sidewall 43. In one embodiment, the flux tube 36 is made of a magnetic steel and is formed by a deep drawing process to reduce costs. A housing 52 is mounted to the bobbin 42 and wires are attached to terminal contacts in the housing 52 so that electrical current or an electrical signal can be provided into the can 26 to energize the coil 40.

A cylindrical armature 54 is slidably received in the cavity 48 and is nearly completely surrounded by the bobbin 42, as shown. In this configuration, an inside surface of the bobbin 42 acts as a bearing surface when the armature 54 is slidably reciprocated within the cavity 48 between first and second positions. In one embodiment, the armature 54 is made of a magnetic, sintered powdered metal to receive the magnetic flux field created by the coil 40 when it is energized. However, the armature 54 can be made of any suitable magnetic material. The armature 54 has a central blind bore 56 extending into the armature 54 from a top surface. The bore 56 preferably extends well into the armature 54 to reduce the weight of the valve 10. A relatively low force spring 58 is retained at one end in the bore 56 and at its other end by a spring seat 60 formed on the end wall 44 of the bobbin 42. The spring 58 is compressed between the top wall 44 and the armature 54 so that it yieldably biases the armature 54 in a direction away from the end wall 44. The armature has a lower seat 62 which may be defined by a recess or cavity formed in the armature 54.

A pole piece or upper valve stop 64 is positioned at the bottom of the can 26 and is trapped between an outwardly extended flange 66 of the bobbin 42 and the flange 30 in sleeve 28. In one embodiment, the upper valve stop 64 is made of a ferromagnetic steel and may comprise a magnetic washer. A central opening 68 is provided in the upper valve stop 64 generally aligned with the seat 62 of the armature 54. An air gap 70 is defined between the upper valve stop 64 and a bottom surface of the armature 54.

When the coil 40 is energized, the magnetic flux generated causes the armature 54 to move toward the upper valve stop 64 with the bias of the spring 58 to narrow the air gap 70. The closer the armature 54 is to the upper valve stop 64 (which is preferably a magnetic pole piece), the greater the magnetic attraction, causing an increased force on the armature 54. The amount of current applied to the coil 40 for a particular air gap 70, spring force, and specific application would be known to those skilled in the art.

The fluid control portion 24 comprises the outer sleeve 28, an inner sleeve 72 and a spool valve 74. The outer sleeve 28 has a stepped throughbore 76 and circumferentially spaced passages 78 which communicate a chamber 80 defined between the sleeve 28 and the casting 14 with the stepped bore 76. The chamber 80 communicates directly with the control port 20. The stepped bore 76 defines first and second radially inwardly extending annular shoulders 82, 84 and leads to an open end 86 of the outer sleeve 28 which directly communicates with the opening 12 in the casting 14. Axially spaced outer grooves 88, 90 receive the O-rings 16 and 18, respectively.

The inner sleeve 72 has a radially outwardly extending flange 92 trapped between the upper valve stop 64 and the first shoulder 82 of the outer sleeve 28, a generally cylindrical sidewall 94, a blind bore 96 defining a cavity 98 and a counterbore 100 defining a shoulder extending radially inwardly into the cavity 98 to define a lower valve stop 102. The inner sleeve 72 also has a reduced diameter end portion defining a radially outwardly extending shoulder 106 disposed adjacent to the second shoulder 84 of the outer sleeve 28 in assembly and defining an annular passage 108 between the inner and outer sleeves 72, 28, respectively. A first set of circumferentially spaced ports 110 formed through the inner sleeve 72 communicate the cavity 98 in the area of the counterbore 100 with the chamber 80 through the passages 78 formed in the outer sleeve 28. A second set of circumferentially spaced ports 112 formed through the inner sleeve 72 communicate the cavity 98 with the annular passage 108, and hence, the opening 12.

The generally cylindrical spool valve 74 is slidably received within the cavity 98 of the inner sleeve 72. The spool valve 74 is an axially elongate member with an upper land 114 at one end, a lower land 116 at an opposite end and a reduced diameter body portion 118 between the lands 114, 116. As the valve 74 moves the lower land 116 slides along an inner bearing surface of the cavity 98 to align the spool valve 74 and guide it for axial reciprocation. The spool valve 74 includes a stepped blind bore 122 defining a shoulder 124 therein. A valve spring 126 is positioned between the shoulder 124 and a bottom wall 128 of the cavity 98. The valve spring 126 yieldably biases the spool valve 74 towards the armature 54. A vent passage 130 through the valve 74 communicates the bore 122 with the opening 68 through the upper valve stop 64 and hence, communicates the bore 122 with the exhaust ports 38 and 46.

In accordance with one aspect of the present invention, the outer diameter of at least a lower surface 132 of the upper land 114 is greater than the inner diameter of the cavity 98 in the area of the lower valve stop 102. Thus, axial movement of the spool valve 74 in a first direction is limited by engagement of the lower surface 132 of upper land 114 and the lower valve stop 102. The upper land 114 preferably has an axially extending annular rim 134 providing a valve seat of a diameter greater than the opening 68 through the upper valve stop 64 and constructed to engage a sealing surface 136 of the upper valve stop 64. Thus, axial movement of the spool valve 74 in a second direction is limited by engagement of the rim 134 with the upper valve stop 64. The valve 74 also preferably has a stem 138 projecting from the upper land 114 and constructed and arranged to extend through the opening 68 in the upper valve stop 64 to engage the armature seat 62.

FIG. 3 shows the control valve 10 when the coil 40 is not energized. The valve spring 126 has a greater spring force than the armature spring 58, and the spool valve 74 and armature 54 are forced upward (as viewed in FIG. 3) until the spool valve 74 reaches a first sealing position with the rim 134 of the upper land 114 engaged with the seal surface 136 of the upper valve stop 64. This seals the cavity 98 in the inner sleeve 72 from the exhaust ports 38 and 46. Hydraulic transmission fluid at a source pressure $P_s$ applied to the opening 12 flows to the chamber 80 and control port 20 via the annular passage 108, second set of ports 112, the cavity 98 in the area of the body portion 118 of the valve 74, the first set of ports 110, and the passages 78 in the outer sleeve 28 so a control pressure $P_c$ at control port 20 is substantially the same as the source pressure $P_s$.

When the coil 40 is energized, the armature 54 is moved toward the upper valve stop 64 and causes the spool valve 74 (engaged with the armature 54 via stem 138) to move against the bias of its spring 126. The armature 54 and spool valve 74 move in this direction until the spool valve 74 reaches a second sealing position with the lower surface 132 of the upper land 114 engaged with the lower valve stop 102 sealing off the supply port 12 from the control port 20. Because the rim 134 does not contact the seal surface 136 in this configuration, the control pressure $P_c$ in the chamber 80 and the passages 78 in the outer sleeve 28 is allowed to vent to the exhaust ports 38 and 46 through the actuating portion 22. The closer the armature 54 is to the upper valve stop 64, the greater the magnetic attraction between them providing an increased sealing force between the lower surface 132 and the lower valve stop 102.

Metering edges, defined by the rim 134, the overlap of the seat or rim 134 and the seal surface 136, and the overlap of the lower surface 132 and the seal surface of the lower valve stop 102, may be minimal and are determined by the desired amount of current applied to the coil 40, the relative spring rates or force of the springs 58 and 94, as well as the acceptable amount of leakage. Desirably, the spool valve 74 seals axially in both its first and second sealing positions and does not depend for its sealing on closely controlled radial arrangement of the valve lands 114,116 and the bore or cavity 98 in which the spool valve 74 is received. Accordingly, a significant reduction in leakage within the control valve 10 can be achieved. Further, because of the type of axial sealing provided, the spool valve 74 can be relatively loose fitting within the inner sleeve 72 for most of its length because the tightness of the fit does not determine the amount of leakage. Therefore, significantly less expensive processing is required.

The foregoing discussion discloses and describes merely an exemplary embodiment of the present invention. One skilled in the art will readily recognize from such discussion, and from the accompanying drawings and claims, that various changes, modifications and variations can be made therein without departing from the spirit and scope of the invention as defined in the following claims. For example, the spool valve 74 as shown has the stem 138 extending through the opening 68 in the upper valve stop 64, however, a stem could be carried by the armature 54, or both the armature 54 and spool valve 74 could have mating stems. Further, the upper valve stop 64 in the embodiment shown and described also functions as a magnetic pole piece. Separate valve stop members and pole pieces could be provided.

What is claimed is:

1. A solenoid control valve, comprising:
   a housing;
   a solenoid portion carried by the housing and having a bobbin defining at least in part a cavity, a coil wound on the bobbin surrounding at least a portion of the cavity, and an armature disposed at least in part within the cavity and movable between a first position and a second position in response to application of an electrical signal to the coil;
   a flow control portion carried by the housing and having a valve body with a central bore, a valve stop having an opening therethrough of a first diameter generally aligned with the central bore, and a spool valve received for axial reciprocation within the central bore and responsive to movement of the armature during at least a portion of the movement of the armature between its first and second positions so that the spool valve is in a first sealing position when the armature is in its first position, said spool valve having a first sealing surface of a second diameter greater than said first diameter which is axially engageable with the valve stop when the spool valve is moved to its first sealing position to prevent fluid flow through the opening of the valve stop, wherein the valve stop is a ferromagnetic member;
   a valve spring yieldably biasing the spool valve to its first sealing position and into engagement with the armature; and an armature spring yieldably biasing the armature toward its second position and wherein the valve spring provides a force moving the spool valve to its first sealing position and the armature to its first position against the bias of the armature spring when an electrical signal is not applied to the coil.

2. The control valve according to claim 1 further comprising a second valve stop carried by the valve body and defining an opening of a third diameter and wherein the spool valve has a first land with an outer diameter which is greater than said third diameter and a body portion having a outer diameter less than said outer diameter of the first land defining a shoulder between the first land and the body portion, said shoulder being axially engageable with the second valve stop when the spool valve is in a second sealing position spaced from said first sealing position.

3. The control valve according to claim 2 further comprising a control pressure area and a source pressure area both in fluid communication with the central bore and with each other when the spool valve is in its first sealing position and wherein the spool valve prevents communication between the control pressure area and source pressure when the spool valve is in its second sealing position.

4. The control valve according to claim 3 which also comprises an exhaust port in the housing and wherein the control pressure area is communicated with the exhaust port when the spool valve is in its second sealing position.

5. The control valve according to claim 1 further comprising a stem carried by one of the spool valve and the armature, said stem extending through the opening of the valve stop to provide direct contact between the armature and spool valve.

6. The control valve according to claim 1 wherein the armature moves from its first position to its second position in response to application of an electrical signal to the coil with the armature bearing on the spool valve during at least a portion of said movement of the armature to move the spool valve to its second sealing position against the bias of the valve spring.

7. The control valve according to claim 1 wherein the control valve is used to control hydraulic pressure in a vehicle transmission.

8. A solenoid control valve, comprising:
a housing;
a bobbin carried by the housing;
an electromagnetic coil wound on the bobbin and disposed in communication with an electrical signal source;
an armature positioned within the housing for axial reciprocation and having a first end and a second end, said armature being responsive to application of an electrical signal to the coil to move from a first position to a second position;
a valve body connected to the housing and having a valve chamber aligned with the armature, said valve body including a supply port and a control port both in fluid communication with the valve chamber;
a spool valve disposed within the valve chamber of the valve body, having a first end in contact with the second end of the armature during at least a portion of the range of armature movement, a second end and a first sealing surface, said spool valve being axially movable in response to at least a portion of the movement of the armature;
a valve spring yieldably biasing the spool valve to cause the spool valve to move the armature to its first position in the absence of an electrical signal applied to the electromagnetic coil;
a first valve stop positioned between the armature and the spool valve and engageable by the first sealing surface of the spool valve when the armature is in its first position so that the spool valve is sealed against the first valve stop by an axially applied force to communicate the supply port and the control port through the valve chamber;
an armature spring yieldably biasing the armature toward its second position and wherein the valve spring provides a force moving the spool valve to its first sealing position and the armature to its first position against the bias of the armature spring when an electrical signal is not applied to the coil; and
an opening through the first valve stop and a stem carried by one of the armature and the spool valve, said stem extending through the opening to provide direct contact between the spool valve and armature during at least a portion of the range of movement of the armature;
wherein the first valve stop comprises a pole piece and defines a working gap with the armature.

9. The control valve according to claim 8 further comprising a second valve stop positioned within the valve body and a valve land carried by the spool valve, said valve land engaging the second valve stop in an axial direction relative to the movement of the spool valve when the armature is in its second position.

10. The control valve according to claim 9 wherein the spool valve has a first land of a first diameter at the first end of the spool valve, a body portion having a second diameter less than the first diameter and being connected to the first land, and a shoulder defined between the first land and the body portion, said shoulder being engageable with the second valve stop to provide a seal between them and thereby prevent fluid communication between the control port and supply port.

11. A solenoid control valve, comprising:
a housing;
a bobbin carried by the housing and defining at least in part a cavity;
a coil wound on the bobbin surrounding at least a portion of the cavity;
an armature disposed at least in part within the cavity and being movable between a first position and a second position;
an upper valve stop carried by the housing and having an opening therethrough;
a lower valve stop carried by the housing;
a valve body carried by the housing and having a central bore aligned with the armature, said valve body including a supply port and a control port in fluid communication with the central bore;
a spool valve received for axial reciprocation within the central bore and movable to a first sealing position when the armature is in its first position and a second sealing position when the armature is in its second position, said spool valve having a first sealing surface engageable with the upper valve stop when the spool valve is in its first sealing position to communicate the supply port and the control port and a second sealing surface engageable with the lower valve stop when the spool valve is in its second sealing position to at least substantially restrict communication between the supply port and control port;

a stem carried by one of the armature and the spool valve, said stem extending through the opening in the upper valve stop to provide direct contact between the spool valve and the armature during at least a portion of the movement of the armature;

a valve spring yieldably biasing the spool valve to its first sealing position and into engagement with the armature;

an armature spring yieldably biasing the armature toward its second position and wherein the valve spring provides a force moving the spool valve to its first sealing position and the armature to its first position against the bias of the armature spring when an electrical signal is not applied to the coils and a pole piece carried by the housing between the armature and the spool valve and having an opening, and wherein the stem extends through the opening in the note piece and said note piece and said armature define at least in part a working gap between them;

wherein the upper valve stop is carried by the pole piece;

wherein the upper valve stop is integral with the pole piece.

12. The control valve according to claim 11 wherein the control valve is used to control hydraulic pressure in a vehicle transmission.

13. The control valve according to claim 11 wherein the spool valve has a general cylindrical configuration including a first land of a first diameter and a body portion having a second diameter less than the first diameter defining a shoulder between the first land and the body portion, said shoulder defining said second sealing surface.

14. The control valve according to claim 13 wherein the lower valve stop has an opening therethrough of a diameter larger than the second diameter permitting axial movement of the body portion through the opening but smaller than the first diameter such that the shoulder axially engages the lower valve stop when the spool valve is in its second sealing position.

15. The control valve according to claim 13 wherein the first sealing surface is carried by the first land and has an outer diameter greater than the diameter of the opening through the upper valve stop so that the first sealing surface axially engages the upper valve stop when the spool valve is in its first sealing position to at least substantially prevent fluid flow through the opening of the upper valve stop.

* * * * *

UNITED STATES PATENT AND TRADEMARK OFFICE
CERTIFICATE OF CORRECTION

PATENT NO. : 6,792,975 B2
DATED : September 21, 2004
INVENTOR(S) : Bradley C. Erickson et al.

It is certified that error appears in the above-identified patent and that said Letters Patent is hereby corrected as shown below:

<u>Column 9,</u>
Line 14, "coils" should be -- coil; --.
Line 18, "note piece and said note" should be -- pole piece and said pole --.

Signed and Sealed this

Ninth Day of August, 2005

JON W. DUDAS
*Director of the United States Patent and Trademark Office*